(12) United States Patent
Pomes

(10) Patent No.: US 6,816,076 B2
(45) Date of Patent: Nov. 9, 2004

(54) ARTICLE ADAPTED TO BE TRACKED BY AN ELECTRONIC IDENTIFIER

(75) Inventor: Francoise Pomes, Chavenay (FR)

(73) Assignee: Allibert Equipement, Nanterre (FR)

( * ) Notice: Subject to any disclaimer, the term of this patent is extended or adjusted under 35 U.S.C. 154(b) by 15 days.

(21) Appl. No.: 10/290,470

(22) Filed: Nov. 8, 2002

(65) Prior Publication Data

US 2003/0090388 A1 May 15, 2003

(30) Foreign Application Priority Data

Nov. 9, 2001 (FR) .......................................... 01 14558

(51) Int. Cl.[7] .............................................. G08B 13/14
(52) U.S. Cl. .............................. 340/572.1; 340/572.7; 340/572.8
(58) Field of Search ........................ 340/572.1, 572.7, 340/572.8; 343/700 R

(56) References Cited

U.S. PATENT DOCUMENTS

| | | | | |
|---|---|---|---|---|
| 5,491,483 A | * | 2/1996 | D'Hont | .................... 342/42 |
| 5,986,562 A | * | 11/1999 | Nikolich | .................... 340/693.5 |
| 6,172,608 B1 | | 1/2001 | Cole | |
| 6,191,691 B1 | * | 2/2001 | Serrault | .................... 340/572.8 |
| 6,249,226 B1 | * | 6/2001 | Harrison et al. | ........ 340/572.1 |
| 6,340,932 B1 | | 1/2002 | Rodgers et al. | |

FOREIGN PATENT DOCUMENTS

| | | |
|---|---|---|
| EP | 0 333 388 A2 | 9/1989 |
| FR | 2760998 A1 | 9/1998 |
| FR | 2812482 A1 | 2/2002 |

* cited by examiner

*Primary Examiner*—Daniel J. Wu
*Assistant Examiner*—Sihong Huang
(74) *Attorney, Agent, or Firm*—Rothwell, Figg, Ernst & Manbeck, P.C.

(57) ABSTRACT

The invention proposes a trackable device locally incorporating an electronic identifier comprising an integrated circuit which includes a memory and an antenna, and which is able to exchange data with a read and/or write device which is spaced at a maximum by a first predetermined communication distance. A second antenna which is able to communicate without electric contact, in particular with the identifier, is arranged at a distance from the identifier smaller than or equal to the first predetermined distance, so as to form a relay and increase the maximum distance for exchange of data between the identifier and the read and/or write device.

9 Claims, 5 Drawing Sheets

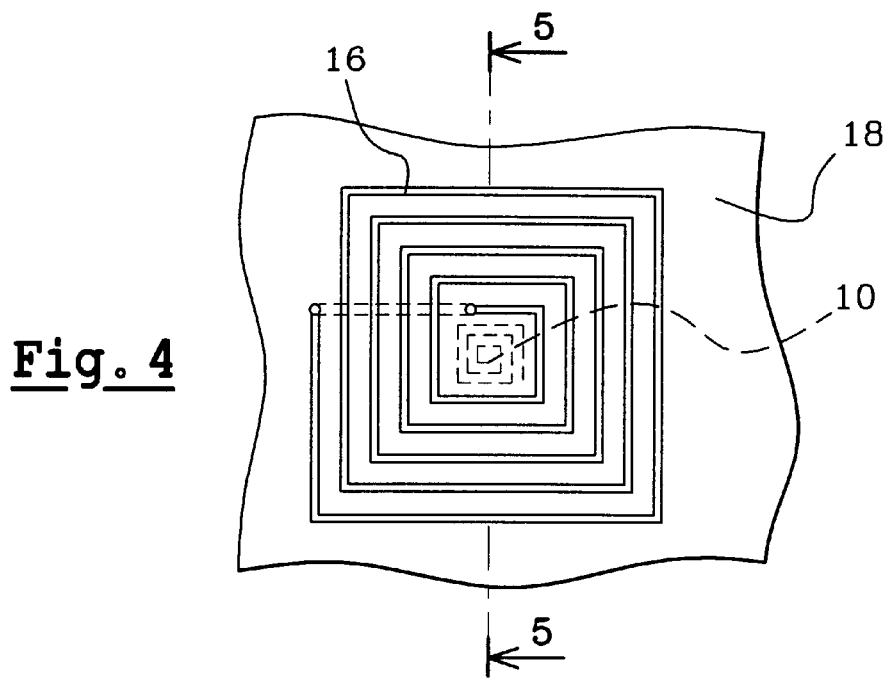
Fig. 4
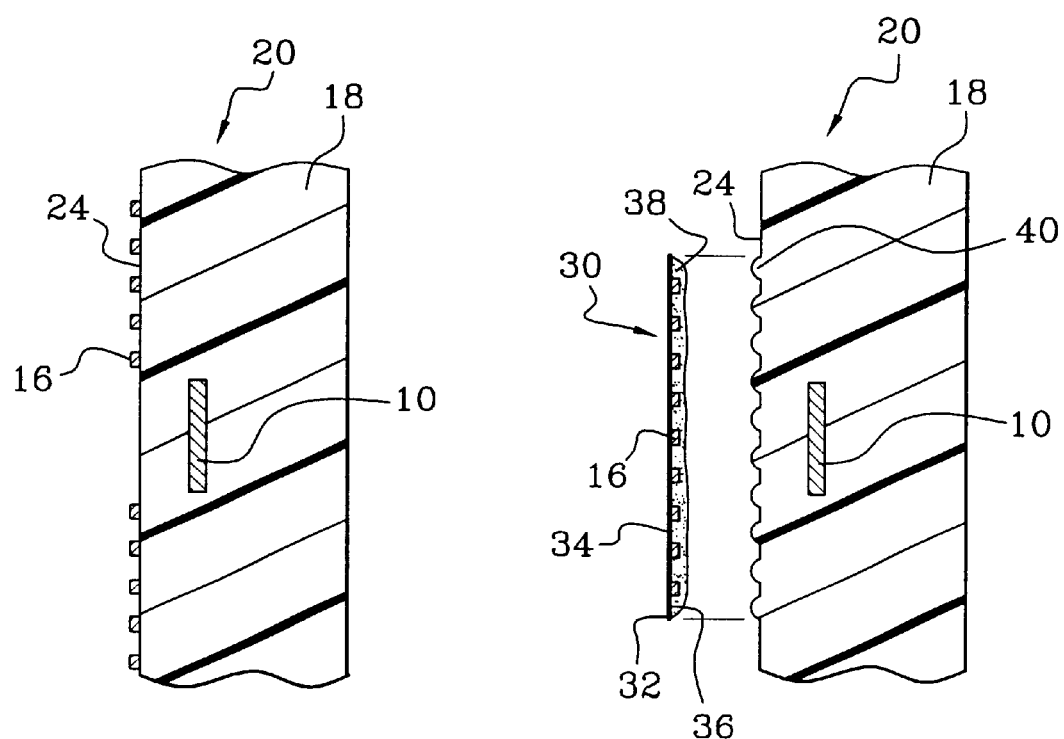
Fig. 5
Fig. 6

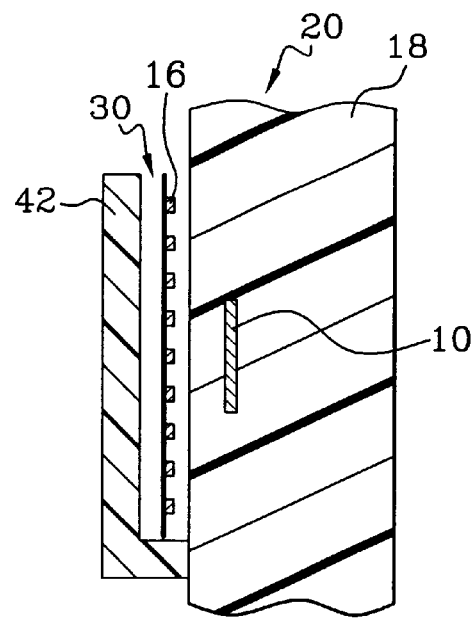
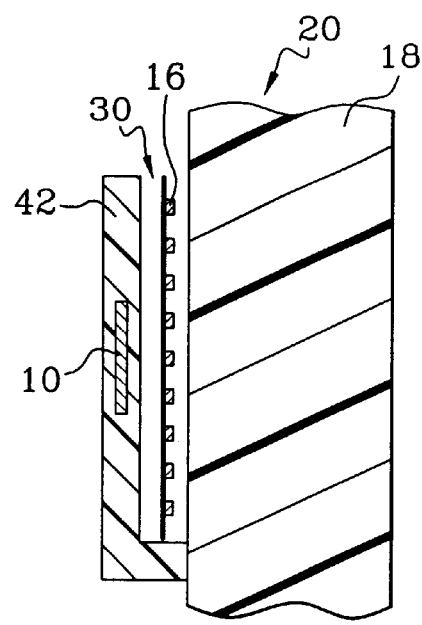
Fig. 7    Fig. 8
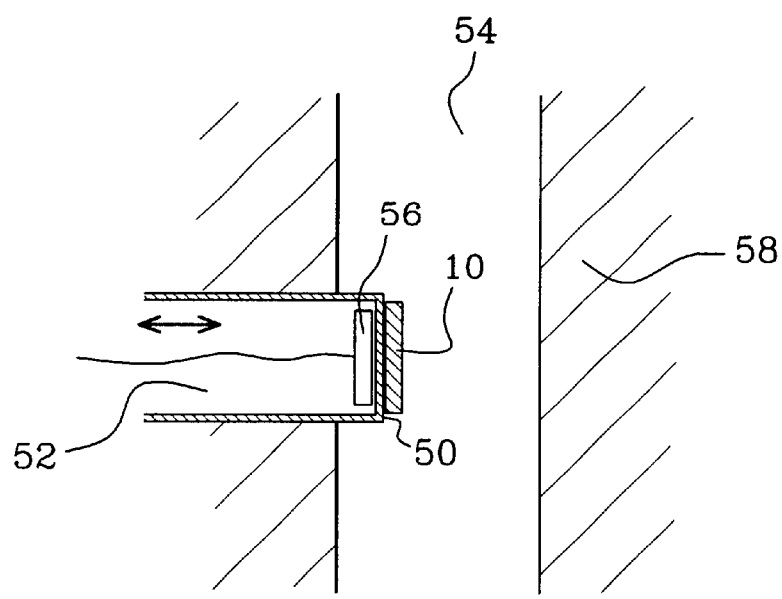
Fig. 9

ARTICLE ADAPTED TO BE TRACKED BY AN ELECTRONIC IDENTIFIER

BACKGROUND OF THE INVENTION

1. Field of the Invention

The invention is related to a manufactured article or a carrier adapted to be electronically tracked by an electronic tracer means.

2. Description of the Related Art

In order to be able to track articles such as packagings or products, it is known to apply an electronic tag, also known as an electronic identifier, of the contactless type to one of their walls. The tag may be fixed to the article by adhesion, riveting, etc., but this solution is unsatisfactory. Dirt is able to infiltrate between the tag and the wall, making it difficult to clean the article. In addition, the tag has to be wrapped in a protective casing or housing. This increases the number of components to be assembled and the production costs of the packaging.

The tag may also be incorporated in the packaging.

In the field of logistics, more particularly plastics packagings for handling, such as crates and pallets, it is known to mould the article round the electronic tag.

The electronic tag of the contactless type is composed of an integrated circuit comprising, in particular, a memory which stores identification information for the packaging and for an antenna which is electrically connected to the integrated circuit so that it may communicate remotely with a suitable read and/or write device.

Communication is achieved in a known manner by remote electromagnetic coupling between the integrated circuit and the read and/or write device. The frequency of the electromagnetic field is generally within the radio frequency range so the method of communication is also known as radio-frequency communication.

Communication may be carried out in read mode or in read/write mode.

In the first case, the identifier comprises information which enables the packaging to be identified and may only be read by a suitable device. The advance of the packaging may therefore be followed by reading devices arranged in succession on its path.

In the second case, the information stored by the identifier may be read and modified.

It is thus possible to modify the information stored in the memory of the identifier, for example as a function of the progress of the packaging and/or of the product which it contains.

The electronic identifier does not generally have its own energy source so it is supplied remotely by the read/write device.

For this purpose, the read/write device emits a beam of energy in the form of an alternating magnetic field which is received by the antenna.

The maximum reading distance of the identifier depends on the power of the energy beam emitted by the read/write device and the dimensions of the antenna.

There are standards which limit the power of energy emitted by the read/write device. In Europe, the most widely used frequency is 13.56 MHz and, in this case, the power emitted may not exceed 1 watt. Therefore to increase the reading/writing distance of the identifier, it is necessary to increase the dimensions of the antenna.

The antenna may have the form of a plane spiral winding of a narrow electrical conductive element such as a strip of copper.

By way of example, a square plane antenna having sides of 20 mm enables the integrated circuit to communicate with a read/write device having a frequency of 13.56 MHz at a distance of 200 mm.

The antenna and its electrical connection to the associated integrated circuit are fragile. For the over-moulding of plastics material, the identifier has to be wrapped during the injection stage so as to resist high temperature and pressure.

A process for wrapping an identifier is disclosed in the document FR-A-97.03456. It mainly involves fixing the plane face of the tag formed by the antenna on a plastics material substrate which is stuck in the mould prior to injection. The substrate enables the tag to be positioned inside the wall of the injected article and enables the strength of the antenna and its connection to the integrated circuit to be increased. The cost for wrapping is high and the identifier is still fragile.

A wrapper of this type increases the bulk of the identifier.

The electronic identifier may not be arranged in certain zones of the packaging having dimensions which are smaller than those of the wrapped identifier. It is therefore impossible to incorporate an electronic identifier in a tag holder (in particular a "Galia" type tag holder) intended to be applied to the packaging, because it does not have a sufficiently large zone to receive the wrapped identifier.

In addition the identifier must be arranged in a zone of the packaging which is sufficiently rigid to prevent deformation of said zone from stressing the identifier in such a way as to break the antenna or its connection to the integrated circuit.

The antenna can also consist of a coil which is wrapped by the integrated circuit in a cylindrical bulb.

To increase the maximum reading distance, it is necessary to increase the dimensions of the coil. This poses a problem if the identifier is to be incorporated in a thin zone of the packaging because the diameter of the identifier has to remain smaller than the thickness of the thin zone. In addition, the cost of the wrapping is high as in the previous case.

SUMMARY OF THE INVENTION

To overcome the above-mentioned drawbacks, an object of the invention is an electronically trackable carrier made of a material, having an external surface and an interior, the carrier comprising:

- an electronic tracer means (also called electronic identifier) comprising an integrated electronic circuit and a first antenna connected thereto, the first antenna being adapted to operate as at least one of a signal receiver and a signal transmitter, for respectively receiving and emitting a signal, said signal having a predetermined range,
- a non-embedded, wireless second antenna adapted to operate a wireless communication with the electronic tracer means and located apart from the interior of the material, for defining a signal relay adapted for enlarging the range of the signal.

According to preferred additional features, the carrier is advantageously made of plastic material, the electronic identifier is able to exchange data with a read and/or write device which is spaced at a maximum by a first predetermined communication distance from the electronic identifier, and the second antenna (which is able to communicate without electric contact, in particular with the identifier) is arranged at a distance smaller than or equal to the first predetermined distance of the identifier so as to increase said first predetermined distance to a second maximum distance for exchange of data between the identifier and the read and/or write device.

According to further characteristics of the invention:

the antenna is applied to a face of the portion in which the electronic identifier is incorporated;

the second antenna is printed on the external surface of the material, viz the antenna is imprinted on a face of the portion in which the electronic identifier is incorporated;

the second antenna is stuck to the external surface of the plastic material, viz is stuck on a face of the portion in which the electronic identifier is incorporated;

the antenna is carried by an additional element applied to the portion in which the electronic identifier is incorporated;

the additional element is a tag (also called label);

the carrier has a wall, and the electronic tracer means is embedded in said wall, within the interior of the material.

the carrier is one of the following handling means: a plastic crate, a plastic pallet, a bottle rack, a plastic bin, a plastic basket, a container;

the wall externally defines at least a zone of said external surface, the carrier is provided with a label comprising the second antenna, the label being disposed adjacent to said external surface defined by the wall, and the carrier comprises a label holder (also called tag holder) attached to the wall of the carrier and having an opening adapted for receiving the label in the label holder;

the carrier further comprises an additional element, provided with the second antenna, the additional element being disposed on said external surface.

the label holder is removably attached to the wall.

the label holder is permanently attached to the wall.

the additional element is a stuck label (or stuck tag).

According to a further object, the invention is also related to an element for a carrier member, for defining an assembly adapted to be electronically trackable by an electronic identifier located apart from the assembly, the element being made of a material having an external surface and an interior, the element comprising, in said interior, an electronic tracer means comprising an integrated electronic circuit and a first antenna connected thereto, the first antenna being adapted to operate as at least one of a signal receiver and a signal transmitter, for respectively receiving and emitting a signal, said signal having a predetermined range, the assembly comprising a wireless second antenna adapted to operate a wireless communication with the electronic tracer means and located apart from the interior material of the element, for defining a signal relay adapted for enlarging the range of the signal, so that the electronic tracer means communicate through the signal, within said enlarged range, with the electronic identifier.

According to such an approach, it is furthermore advise that:

the carrier member is one of the following handling member: a plastic crate, a plastic pallet, a bottle rack, a plastic bin, a plastic basket, a container, the element is attached to the carrier member, and the second antenna is located adjacent the first antenna.

the carrier member is a plastic crate, having a bottom wall and lateral walls, the material is a plastic material, the electronic tracer means is embedded in said plastic material, and the element is a label holder attached to one of the lateral walls of the plastic crate.

The invention also proposes a method of producing a trackable article of the aforementioned type, characterised in that the electronic identifier is incorporated in a portion of the device during a stage of moulding, in that the article is demoulded then in that the second antenna is arranged on the article at a distance smaller than or equal to the first predetermined distance of the identifier.

According to a further characteristic of the method, prior to the moulding stage, the electronic identifier is wrapped to facilitate handling thereof.

Further characteristics and advantages of the invention will emerge on reading the following detailed description given with reference to the accompanying drawings.

BRIEF DESCRIPTION OF THE DRAWINGS

FIG. 4 is a detailed front view of the wall incorporating an electronic identifier in the vicinity of which a relay antenna is applied according to the invention;

FIG. 5 is a section along the line 5—5 in FIG. 4 of the wall incorporating an electronic identifier and on the external face of which a relay antenna is stuck according to the invention;

FIG. 6 is a variation in which the relay antenna is applied to a self-adhesive tag;

FIGS. 7 and 8 show further variations of the invention;

FIG. 9 is a partial view of an injection mould for a handling crate made of plastics material and equipped with a device for holding and positioning the identifier during the moulding stage.

DETAILED DESCRIPTION OF THE PREFERRED EMBODIMENTS

Figure 1:
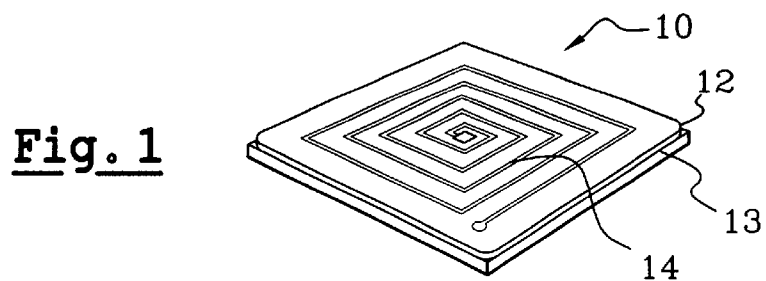
FIG. 1 is a perspective view on a large scale of an electronic identifier.

The invention proposes the use of an electronic tracer means 10, called hereafter the identifier 10, for example of the type produced by the company INSIDE TECHNOLOGIES and sold under the registered trademark IC.Link, which comprises an integrated circuit 12 assembled on a substrate board 13 and of a main antenna 14 associated, without electrical contact, with an intermediate antenna 16 or relay antenna with which it is able to communicate. The intermediate antenna allows the distance for communication between the identifier 10 and a suitable read/write device to be increased.

The identifier 10 is small in dimensions. By way of example, it has the form of a chip which is a few tenths of a millimetre thick and has sides of 1 to 2 millimetres.

The main antenna 14 is advantageously fixed on the integrated circuit 12 without exceeding the dimensions of the substrate 13 and this gives it significant rigidity and strength.

Figure 2:
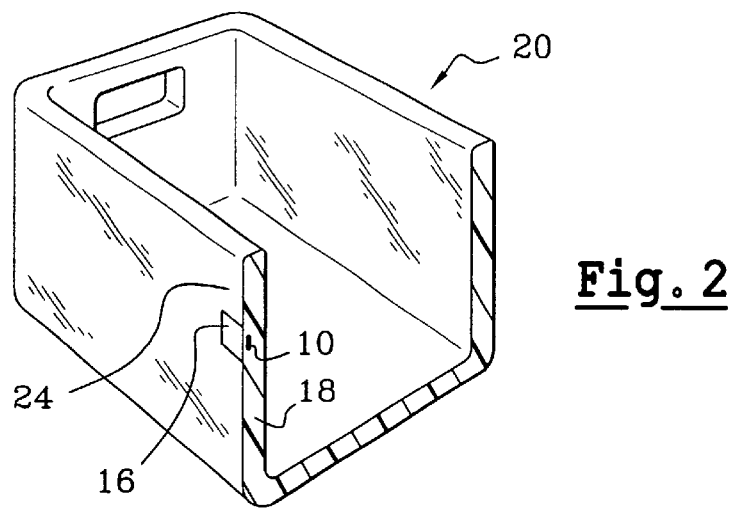
FIG. 2 is a section and perspective view of a handling crate equipped with an electronic identifier and of a relay antenna according to the invention.

In the remainder of the description, by way of nonlimiting example, the trackable article is a packaging, more particularly a handling crate 20 preferably made of plastics material and shown partially in section in FIG. 2. The identifier 10 is incorporated in one of its walls 18, whereas the intermediate antenna defines a non-embedded wireless second antenna adapted to operate a wireless communication with the electronic tracer means and located apart from the interior of the article material, for defining a signal relay adapted for enlarging the range of the signal.

The trackable article is obtained by a plastics moulding process, in particular by injection, by thermoforming, by spun moulding, by blowing, etc.

The handling crate 20 is advantageously obtained by injection moulding of plastics material.

The identifier 10, in particular the main antenna 14 and its connection to the integrated circuit 12, is sufficiently rigid and solid to resist high pressure and temperature during injection moulding of the crate 20. The deformations of the identifier 10 due to thermal and mechanical stresses are sufficiently slight to avoid breakage of the main antenna 14. The identifier 10 may thus be incorporated in the wall 18 of the crate 20 without requiring protection.

Figure 3:
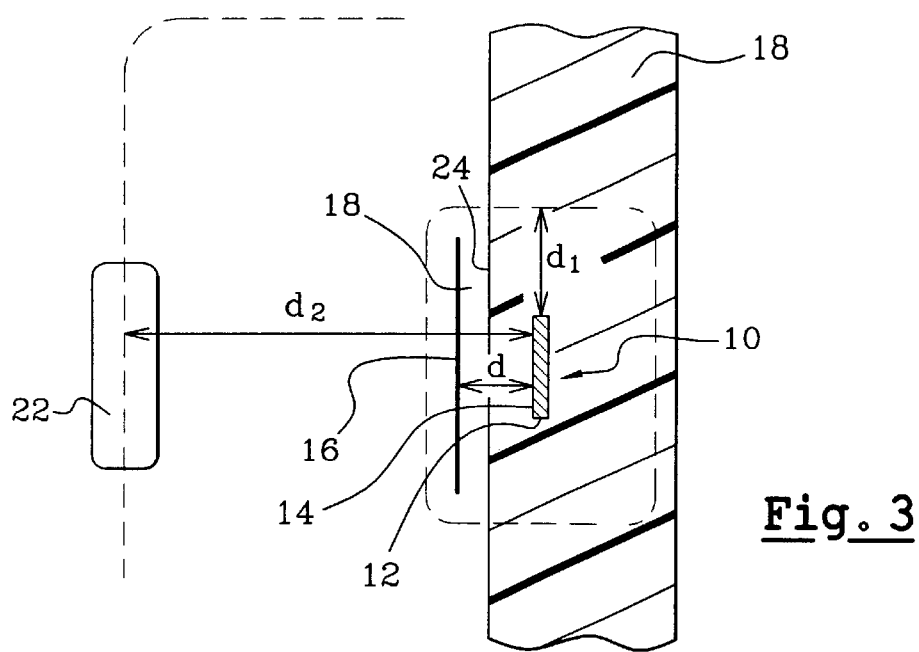
FIG. 3 shows a detailed section of the wall incorporating an electronic identifier in the vicinity of which a relay antenna is applied according to the invention.
Figure 10:
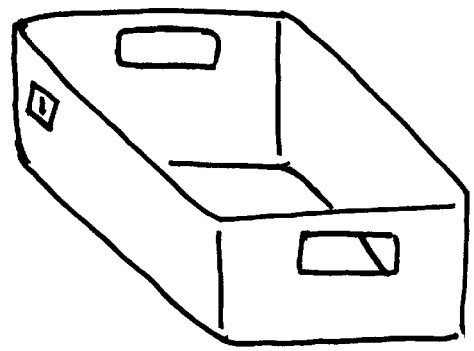
FIGS. 10, 11, 12, 13, 14 and 15 show at various scales successively a plastic crate 10, a plastic pallet, a container, a bottle rack, a plastic baskett and a plastic bin provided each with the electronic tracer system of the invention.
Figure 11:
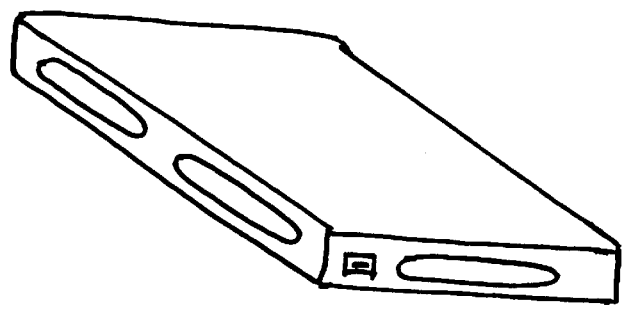
Figure 12:
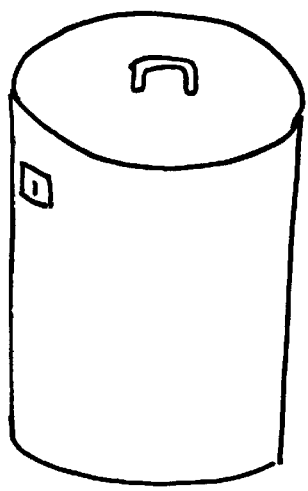
Figure 13:
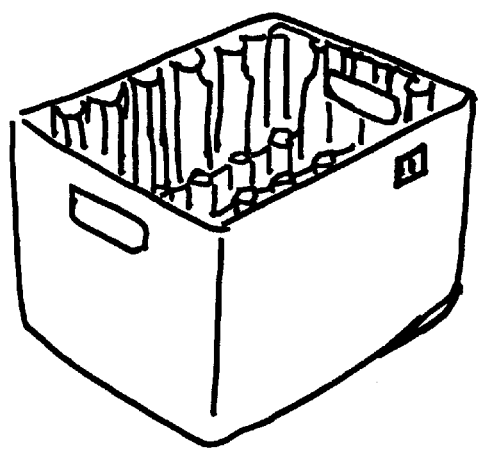
Figure 14:
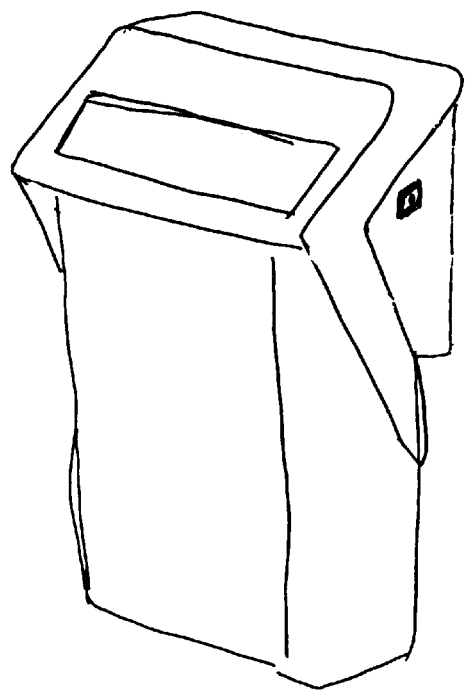
Figure 15:
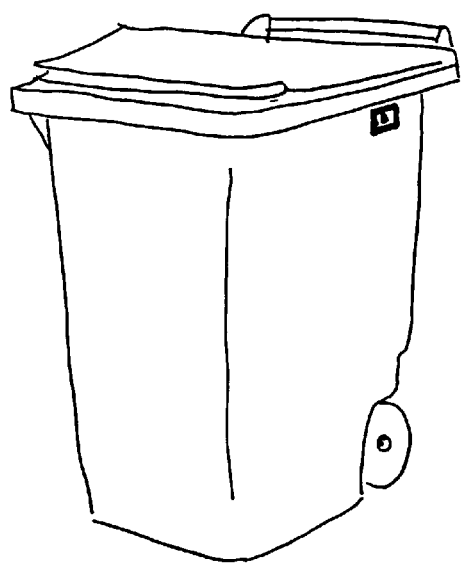

When the identifier 10 is supplied electrically, in particular with an alternating magnetic field, it allows communication with a suitable read/write device 22 which may be spaced by a first predetermined maximum distance $d_1$ shown in broken lines in FIG. 3. In view of the standards in force and the small dimensions of the main antenna 14, the first predetermined distance $d_1$ is of the order of a few millimetres. As this distance is too small for many applications, such as the tracking of crates for logistics purposes, an intermediate antenna 16 is arranged at a distance d from the identifier, the distance d being smaller than the first predetermined distance $d_1$. The intermediate antenna 16 thus allows the first communication distance $d_1$ of the identifier to be increased to a second predetermined distance $d_2$ depending mainly on the dimensions of the intermediate antenna 16.

The dimensions of the identifier 10 and of the intermediate antenna 16 as well as the distances d, $d_1$ and $d_2$ are shown merely for the purpose of illustration in the figures.

Depending on the application for which the crate is intended, it is possible to determine the dimensions of the intermediate antenna 16 so that the second predetermined distance $d_2$ is greater than or equal to the maximum distance between the identifier 10 and the read/receiving device 22.

By way of example, the intermediate antenna 16 may consist of a conducting circuit wound in the form of a plane closed spiral which is applied to the external face 24 of the wall 18 of the crate 20 in the vicinity of the identifier 10 according to FIGS. 4 and 5.

The intermediate antenna 16 may be stuck to the external face 24 of the wall 18. The intermediate antenna 16 may also be imprinted directly on the external face 24, in particular by conductive ink screen printing.

According to a variation, the intermediate antenna 16 may also be fixed on an additional element which is applied to the external face 24 of the wall 18, such as a self-adhesive tag 30 or a tag holder.

These solutions are simple and economical to implement.

An embodiment of this type is shown in an exploded section in FIG. 6. The tag 30 consists of a sheet 32 of paper on the external face 34 of which there may be imprinted information such as bar codes or the description of the product stored in the crate 20 and on the internal face 36 of which, facing the crate 20, the intermediate antenna 16 is fixed, advantageously by imprinting.

The internal face 36 is then covered with adhesive 38 so as to be able to adhere to the external face 24 of the wall 18 of the crate 20.

This solution is very advantageous. Fixing of the intermediate antenna 16 is very simple. In addition, the antenna 16 is protected by the sheet 32.

Depending on the conditions of use of the crate 20, it is easy to change the tag 30 and the dimensions of the antenna 16 for adaptation to the required read/write distances.

The zone of the wall 18 of the crate 20 on which the tag 30 is stuck is covered with small points 40 or beads to facilitate detachment of the tag.

According to a further variation shown in FIG. 7, the crate 20 is equipped with a tag holder 42. The intermediate antenna 16 may be imprinted on the external face 34 of the tag 30 which is slid between the tag holder and the external face 24 of the crate 20.

According to a variation, not shown, the antenna 16 may also be imprinted on the tag holder.

If management and use of the crates are semi automated, the information imprinted on the tag 30 may be displayed by operators and the information stored in the memory of the identifier may be read and modified by a read/receiving device.

In the case of the hire of handling crates 20, for example, users have different read/write devices and operating conditions. A change of the label 30 and of the dimensions of the intermediate antenna 16 enable the trackability of the crates 20 to be adapted optimally to each user.

The invention also allows an article which is not electronically trackable to be equipped easily and at low cost.

This may be achieved by providing the article to be tracked with another trackable article.

If the user possesses a stock of packages which are not trackable, the invention enables him to transform his packages into trackable packages without the need to renew them.

According to FIG. 8, for example, a handling crate 20 is equipped with an accessory such as a tag holder 42 which incorporates an electronic identifier 10 and in the vicinity of which an intermediate antenna 16 according to the invention is arranged.

Adaptation of the crates according to the invention is easy and economical in comparison with an operation of taking back all the crates in order to apply an electronic identifier in a known manner or with replacement of all untrackable crates.

As with earlier solutions, the intermediate antenna 16 may be fixed on a tag 30.

As the identifier 10 does not require any particular wrapping, its incorporation in a packaging entails a slight increase in production costs.

However, the identifier 10 may be wrapped so as to facilitate handling thereof. For example, it may be covered at least in part with a material which is chemically compatible with the plastics material of the crate 20.

In particular, the invention overcomes the fragility of the electrical connection between the main antenna and the integrated circuit of identifiers conventionally used for this type of application.

It is also possible to integrate an electronic identifier in a zone of an article which is capable of being deformed without a risk of deterioration of said electrical connection.

Starting with a single electronic identifier incorporated in an article made of plastics material, the invention also allows the service performance thereof, in particular the communication distance thereof, to be adapted to each application. This greatly reduces the production costs of trackable articles.

The invention also enables an identifier to be incorporated in a small-dimensioned zone of the trackable article.

A process for producing a trackable article such as a crate 20 according to the invention involves arranging an optionally covered identifier 10 in the impression of a mould then injecting plastics material therein in order to mould the crate round the identifier.

The identifier is advantageously held in a predetermined position inside the impression by a known method such as adhesion, magnetic traction, vacuum, etc.

A further solution, shown in FIG. 9, involves fixing the identifier 10 on the free end 50 of a rectractable finger 52 which is located in a predetermined position inside the impression 54 of the mould 58.

The fixing of the identifier 10 is achieved here by means of a device 56 involving magnetic attraction.

During moulding, when the plastics material is in contact with the identifier 10, the identifier 10 is detached from the finger 52 which is then retracted. The identifier 10 is thus incorporated in the wall 18 of the crate 20.

According to a variation, not shown, the retractable finger advantageously comprises automatic identifier supply means at the free end thereof.

When the crate is produced and demoulded, the intermediate antenna 16 is arranged in the vicinity of the electronic identifier 10.

The invention allows simple, economical and reliable production of a trackable article which is made of plastics material and may easily be followed throughout its service life.

The invention may be carried out in numerous applications employing articles made of plastics material such as logistics and management of the actual article or of the product contained therein.

For example, the identifier may be incorporated into the walls of a packaging made of plastics material such as a food tray on which there is stuck a tag carrying the intermediate antenna. The identifier may contain the origin of the food, its price, its shelf life, its heating and/or cooking time, and this information may be read to facilitate the management and use thereof. For example, if a consumer's domestic appliances are equipped with readers, he will know what his refrigerator contains and the use-by dates of the products. In addition, the oven will adjust itself automatically for optimum preparation of the food.

The identifier could also be provided on, or attached to, the lid or the cover of a handling member.

What is claimed is:

1. An electronically trackable carrier having an external surface, an interior, and a wall eternally defining at least a zone of the external surface, the carrier comprising:

an electronic tracer means embedded in the wall comprising an integrated electronic circuit and a first antenna connected thereto, the first antenna being adapted to operate as at least one of a signal receiver and a signal transmitter, for respectively receiving and emitting a signal, said signal having a predetermined range, a wireless second antenna bound to a detachable additional element, adapted to operate a wireless communication with the electronic tracer means, for defining signal relay adapted for enlarging the range of the signal, the additional element being disposed on the wall.

2. The carrier according to claim 1, wherein the detachable element is a label.

3. The carrier according to claim 2, wherein the carrier comprises a label holder attached to the wall of the carrier, and an opening adapted for receiving the label in the label holder.

4. The carrier according to claim 3, wherein the label holder is removably attached to the wall.

5. The carrier according to claim 3, wherein the label holder is permanently attached to the wall.

6. The carrier according to claim 2, wherein the label is affixed to the wall.

7. The carrier according to any one of claims 1–6, wherein the trackable carrier is at least one of a plastic crate, a plastic pallet, a container, a bottle rack, a plastic bin, and a plastic basket.

8. A label holder for a plastic carrier member having a bottom wall and lateral walls, for defining an assembly adapted to be electronically trackable by an electronic identifier located apart from the assembly, the label holder being made of a plastic material having an external surface and an interior, the label holder being attached to one of the lateral walls of the carrier member, the label holder comprising an electronic tracer means embedded in said plastic material, the electronic tracer means comprising an integrated electronic circuit and a first antenna connected thereto the first antenna being adapted to operate as at least one of a signal receiver and a signal transmitter, for respectively receiving and emitting a signal, said signal having a predetermined range, the assembly comprising a wireless second antenna adapted to operate a wireless communication with the electronic tracer means and located apart from the interior material of the label holder, for defining a signal relay adapted for enlarging the range of the signal, so that the electronic tracer means communicate through the signal, within said enlarged range with the electronic identifier.

9. The label holder according to claim 8, wherein the plastic carrier member is at least one of a plastic crate, a plastic pallet, a plastic bottle rack, a plastic bin, and a plastic basket.

* * * * *